US 6,573,681 B2

(12) United States Patent
Schwesig

(10) Patent No.: US 6,573,681 B2
(45) Date of Patent: Jun. 3, 2003

(54) DRIVE CONTROL FOR A THREE PHASE AC MOTOR VIA AN INVERTER USING SAFE TECHNOLOGY

(75) Inventor: Guenter Schwesig, Erlangen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/918,613

(22) Filed: Jul. 31, 2001

(65) Prior Publication Data

US 2002/0084766 A1 Jul. 4, 2002

(30) Foreign Application Priority Data

Nov. 29, 2000 (DE) .......................... 100 59 173

(51) Int. Cl.[7] .............................. H02P 5/34; H02P 7/42
(52) U.S. Cl. ........................................ 318/801; 318/379
(58) Field of Search ................................ 318/379, 380, 318/254, 800, 801

(56) References Cited

U.S. PATENT DOCUMENTS 4,019,116 A * 4/1977 Klautschek ................. 363/138
4,152,758 A * 5/1979 Bailey et al. ................. 363/85
6,239,566 B1 * 5/2001 Tareilus et al. .............. 318/379

FOREIGN PATENT DOCUMENTS

EP          0742637          11/1996

* cited by examiner

Primary Examiner—Jeffrey Donels
(74) Attorney, Agent, or Firm—Baker Botts LLP

(57) ABSTRACT

The combining of two technically contrasting functions of "safe stopping" and "braking by armature short-circuiting" is served by using two means for pulse inhibition to block the respective current valves in the event of a fault by interrupting respective supply voltages for driving the control valves of the upper bridge arm and those of the lower bridge arm. For the purpose of braking by armature short-circuiting, the stator winding of a three-phase AC motor is short circuited in the event of a fault, or else operationally, by virtue of the fact that all current valves of a bridge arm can be switched on, a voltage being provided for switching on these current valves via a logic unit when the respective supply voltage for driving the current valves of this bridge arm are interrupted by the means for pulse inhibition.

10 Claims, 2 Drawing Sheets

DRIVE CONTROL FOR A THREE PHASE AC MOTOR VIA AN INVERTER USING SAFE TECHNOLOGY

BACKGROUND OF INVENTION

1. Field of the Invention

The invention relates to a drive control for a three phase AC motor via an inverter using safe technology and having a possibility for safe stopping and braking by armature short-circuiting.

2. Description of the Related Art

When using electric drives in industrial automation technology, for example in the case of numerically controlled machine tools and robots, a primary objective is the protection for both human operator and the equipment. The objective of "safe stopping" function for the motor is to ensure that even in the case of a single fault, the electric machine and/or the motor cannot execute any dangerous movements. This function is selected as a rule, for example, before opening a protective door.

In one implementation of "safe" technology, a two-fold power shutdown and resulting disconnection from the motor is used. It is generally accepted in this case, the lower and/or the upper transistors or other current valves of an inverter with the bridge circuit are to be turned off separately.

A known possibility for implementing the function of "safe stopping" consists in "safely" blocking the drive signals for the power transistors, which is referred to as "pulse inhibition."

Here, the expression "safe" is intended to express that the respective requirements of any applicable professional associations and/or professional institutes for safety at work are being met.

The drive is to be shut down in the best possible way in the event of a fault. The most unfavorable case is obtained in this case when a measure for pulse inhibition is performed when the drive was moving. The drive then coasts to a standstill. A particularly great danger therefore exists in this phase for operating staff, because the movements can no longer be controlled.

It is therefore desirable to accelerate the braking operation by means of additional measures and additional means. Examples of this are braking by generator (though this is not possible in the case of mains failure or system crash) or mechanical holding braking/service braking. Also known is a method of braking by what is termed "braking by armature short-circuiting."

In the case of braking by armature short-circuiting, the stator winding of the motor is short circuited via switches/contacts or power semiconductors. Kinetic energy which is present, such as is present during the above mentioned coasting of the motor to a standstill is then converted into heat via the stator winding resistors. A variant of such braking by armature short-circuiting is known from European patent application EP 0742637.

In order to effect emergency braking in the event of a fault with electric drives, it is possible to produce a controlled integrated armature short-circuiting by blocking one converter bridge using safe technology while the other inverter bridge uses clocked driving to bring about short-circuiting of the phases of the electric drive. Reaction times and braking time can be optimized by specific timing, for example by optimum torque control via a characteristic.

With regard to the highest possible safety, it would be desirable to combine the function of "safe stopping" with the function of "braking by armature short-circuiting." However, this has presented substantial problems from a technical point of view, because mutually contradictory measures are involved. Whereas the function of "safe stopping" requires precisely reliable blocking of the current valves, for example power transistors, the function of "braking by armature short-circuiting" necessitates precisely switching through the power transistors of a bridge arm in order to produce short-circuiting of the stator winding. No solution to this problem has yet become known.

It is therefore an object of the present invention to implement the two contrasting functions in a combined fashion with one another.

SUMMARY OF THE INVENTION

In accordance with the present invention, this is achieved with a drive control for a three-phase AC motor via an inverter. The inverter includes several current valves in a bridge circuit forming an upper and lower bridge arms. The inverter also includes a first means for the pulse inhibition for the upper bridge arm of current valves, and a second means for the pulse inhibition of the lower bridge arm of current valves. The respective current valves may be selectively blocked by using the first and second means for pulse inhibition, or, in the event that the first and second means fail, by interrupting respective supply voltages for driving the current valves of the upper and lower bridge arms. The inverter also has a means for braking by armature short-circuiting, which may be used to selectively, or in the event of a fault, short-circuit the stator winding of a three-phase AC motor. This is accomplished by switching on all current valves of a bridge arm. In such a case, a logic unit may be used to provide a voltage for switching on these current valves as soon as a respective supply voltage for driving the current valves of this bridge arm and/or those of the other bridge arm are interrupted by a means for pulse inhibition.

Safety may be further enhanced when, in the event of a fault, all drive signals of a drive unit of the drive control for the current valves can be blocked by using at least one means for pulse inhibition.

It is also possible in the case of this implementation for the upper and the lower bridge arms to be blocked separately.

In one embodiment of the invention each means for pulse inhibition can supply a respective signal for driving the logic unit which is configured in such a way that in the event of a fault the voltage for switching off all current valves of a bridge arm can be generated from these signals. In the event of a fault, the logic unit can provide independently of the signals of a drive unit of the drive control a drive signal for the current valves of the bridge arm serving for armature short-circuiting.

Safety may be further improved, by a positive dynamic activation of the two pulse inhibition paths. The positive dynamic activation may be accomplished by reading the supply voltages for driving the current valves of both the first and second means for pulse inhibition of the respective upper and lower bridge arms, and activating the first and second means for pulse inhibition and a means for braking by armature short-circuiting if at least one of the supply voltages readings is lacking.

Yet another embodiment of the invention includes respective optocouplers transmitting drive signals to the current valves. In the event of a fault, the supply voltage of the optocouplers associated with the respectively assigned bridge arm can be interrupted by each means for pulse inhibition.

Safety is further increased when there is a crosswise comparison of external tripping signals assigned to the respective means for pulse inhibition. This can be performed when the two means for pulse inhibition are interconnected via a bi-directional communications interface. In the event of deviating tripping signals, both means for pulse inhibition can be tripped.

According to an embodiment of the invention, in order to drive the two signals the logic unit combines them logically with the drive signals for the current valves of the bridge arm serving the purpose of armature short-circuiting in such a way that with activation of the voltage for switching on all current valves of a bridge arm there is also activation of the drive signals for the current valves of the bridge arm serving the purpose of armature short-circuiting.

If there is a fault in the case when the two signals for driving the logic unit normally conduct high level and a voltage for switching on all current valves of a bridge arm is suppressed by appropriate inverting driver stages of the logic unit, both signals change to low level so that the inverting driver stages of the logic unit provide on the output side a voltage for switching on all current valves of a bridge arm.

A very effective and particularly cost effective logic unit may switch each current valve by a drive unit of the drive control having an associated drive signal with a logic low level. The logic unit then combines the two signals to drive the current valves via a logic AND gate. The logic signal can be further combined via respective further AND gates with the respective drive signals for the current valves of the bridge arm serving the purpose of armature short-circuiting.

Further details and advantages of the invention will become evident from the following description of an advantageous exemplary embodiment and further in conjunction with the further figures. In this case, elements having the same functionality are annotated by the same reference symbols.

DETAILED DESCRIPTION OF THE DRAWINGS

Figure 1:
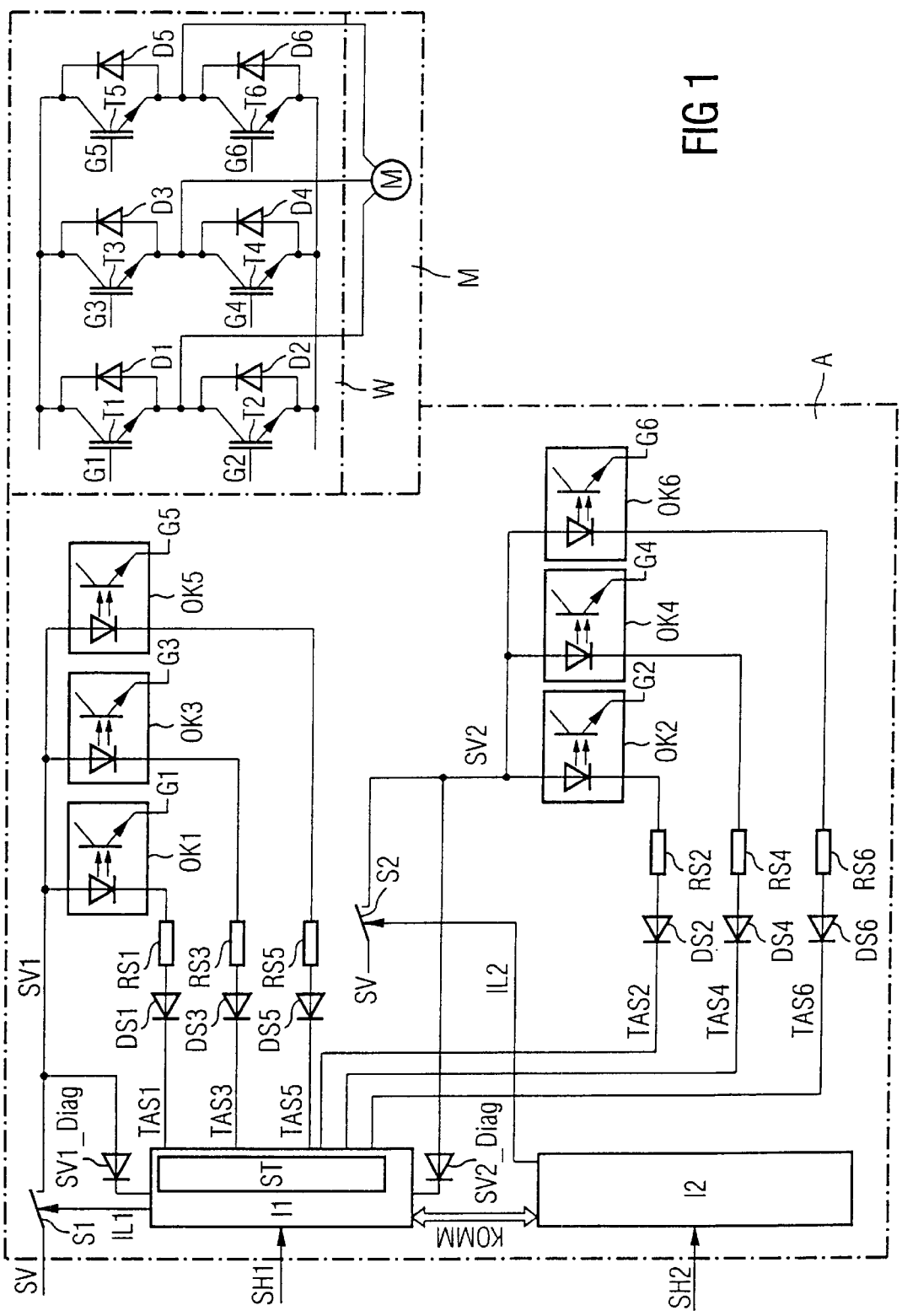
FIG. 1 is a schematic diagram of a drive system having a drive control with the function of "safe stopping."

The schematic diagram of FIG. 1 shows a circuit implementation of the function of "safe stopping" with a drive system having a drive control as illustrated in block diagram form. This drive system is composed of a three phase AC motor M, which is fed via an inverter W with IGBT transistors T1 to T6 arranged in a bridge circuit, as current valves. Each transistor T1 to T6 has a freewheeling diode D1 to D6, respectively, and is driven by respective gate signals G1 to G6 from the drive control A.

The drive control A has two systems I1 and I2, via which the inverter W, and thus the three-phase AC motor M are operated. Each system I1 to I2 includes a controller such as a microprocessor, a microcontroller, an appropriate application-specific integrated circuit ASIC or other control units known in the art. Transistor drive signals TAS1 to TAS6 are calculated in a drive unit ST. The drive unit ST can be as a subsystem arranged in the system I1 or can take the form of a separate unit. The gate signals G1 to G6 are provided via assigned optocouplers OK1 to OK6 and are transmitted to the power transistors T1 to T6. Each photodiode of an optocoupler is connected on the anode side to the supply voltage SV1 or SV2, and is connected on the cathode side to the drive unit ST via a respectively downstream resistor RS1 to RS6 and a further diode DS1 to DS6 polarized in the forward direction. In the present exemplary embodiment, a driven signal TAS1 to TAS6 therefore turns on the associated power transistor T1 to T6 respectively when the drive signal assumes a low level (negative logic).

The function of "safe stopping" is implemented by turning off the power transistors T1 to T6 of the inverter W operationally or in the event of a fault. This is preferably performed by interrupting the supply voltage SV1, derived from an external voltage SV, for the optocouplers OK1, OK3 and OK5 for the upper bridge arm of power transistors via a switch S1 (mechanical or else electronic in design) with the aid of the signal IL1 to the system I1, and a further supply voltage SV2 for the optocouplers OK2, OK4 and OK6 for the lower bridge arm via a switch S2 (mechanical or else electronic in design) with the aid of the signal IL2 to the system I2 and through pulse inhibition in the drive unit ST.

The functionality of the two pulse inhibition paths with the switches S1 and S2 can be checked cyclically and thereby subjected to positive dynamic activation, for example after each time the supply voltage is switched on. For this purpose, after actuation of the switches S1 and S2 the supply voltage SV1 is read back via the signal SV1_Diag, tapped respectively downstream of the switch S1 and S2, and for the supply voltage SV2 via the signal SV2_Diag in the system I1. That is to say, in the event of failure of a system I1 or I2 the operational other system can still continue to react, since even what are termed sleeping faults can be detected by the positive dynamic activation.

The function of "safe stopping" is "reliably" selected via the two signals SH1 and SH2 via the external periphery of two-channel safety switches (not shown). The signal SH1 is applied to the system I1 and the signal SH2 is applied to the system I2. The systems I1 and I2 test the input signals for quality by exchanging information via a communications link KOMM, and in the event of diversity produce the pulse inhibition by means of the switches S1 and S2 and the drive unit ST.

Figure 2:
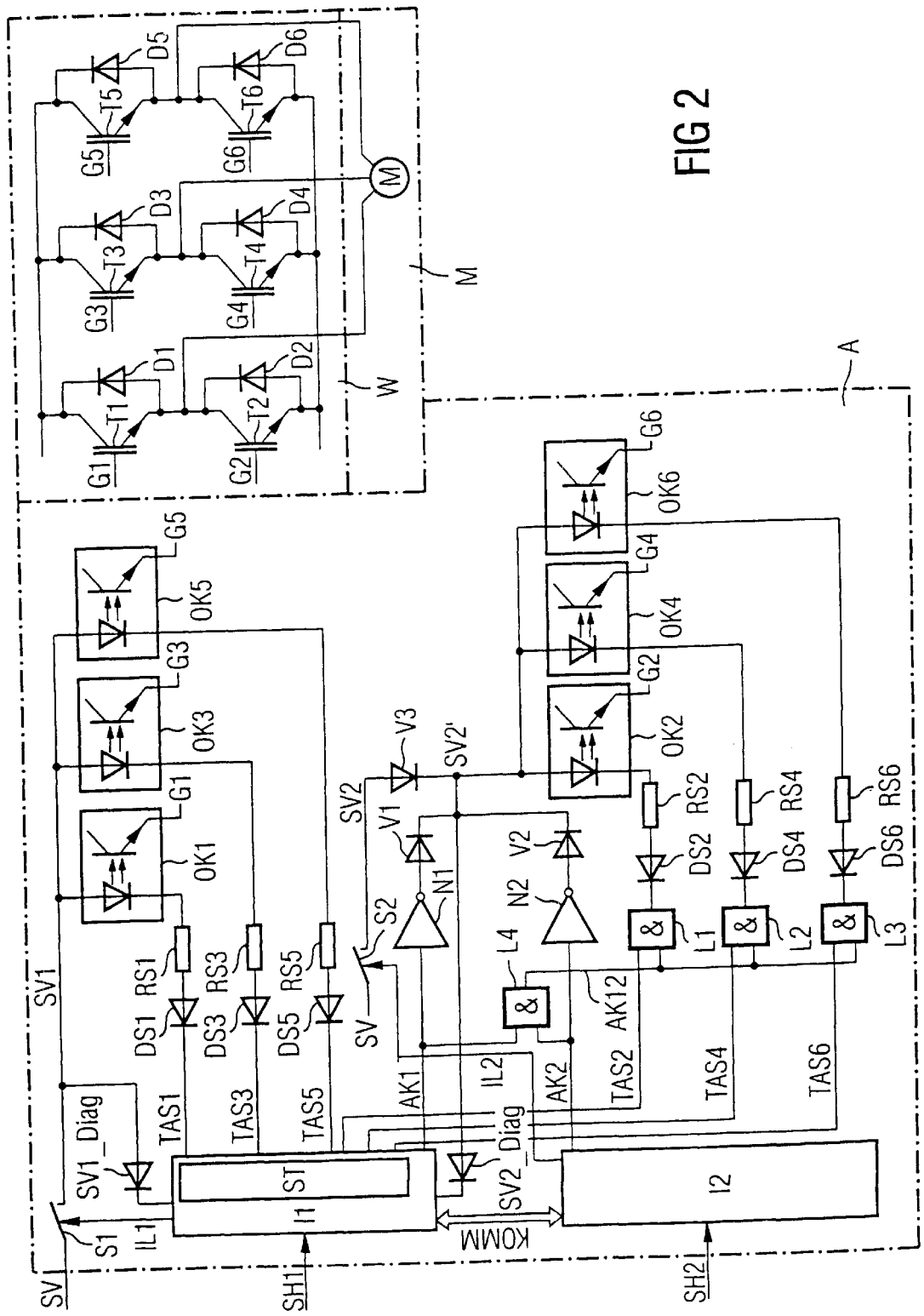
FIG. 2 is a block diagram of this drive system with a combination of the functions of "safe stopping" and "braking by armature short-circuiting" according to the invention.

Referring to the schematic diagram of FIG. 2, this drive system is expanded according to the invention by the function of "safe braking by armature short-circuiting."

In this case, problems can arise in the combination of two contrasting functions. In the case of the function or "safe stopping" the aim is for the drive signals TAS1 to TAS6 to be "reliably" blocked for the power transistors T1 to T6. By contrast, in the case of the function of "braking by armature short-circuiting" the aim is, for example, to "reliably" turn on the transistors T2, T4, T6 of the lower bridge arm whereas, the upper transistors T1, T3, T5 are to remain "reliably" turned off.

For this purpose, either the three upper bridge transistors T1, T3, T5 or three lower bridge transistors T2, T4, T6 of the inverter W are turned on for braking by armature short-circuiting, in order to short-circuit the stator winding of the motor M. Consequently, kinetic energy then present, that occurs in the case of the above mentioned coasting to a standstill of the motor, is converted into heat via the stator winding resistors.

The combination according to the invention of the two functions is shown in the schematic diagram of FIG. 2 and implemented as follows. Each system I1 and I2 makes available a further signal AK1 and AK2 from which in the event of a fault a voltage SV2' for turning on the transistors T2, T4, T6 can be generated in the way described below for the purpose of producing a short circuit of the stator winding.

The switches S1 and S2 are closed in correct operation (pulse release). The signals AK1 and AK2 have high levels. The power supply for the optocouplers OK1, OK3 and OK5 is ensured, as illustrated in FIG. 1, by the supply voltage SV1. The power supply for the optocouplers OK2, OK4 and OK6 is similarly provided via SV2.

The high levels of the signals AK1 and AK2 are negated via inverting drivers N1 and N2 such that no voltage SV2' is made available. In addition, the signals AK1 and AK2 are combined by a logic AND gate L4. The AND gate L4 supplies at the output a signal AK12 which likewise has a high level. The signal AK12, in turn, serves as input signal for further AND gates L1 to L3. The AND gate L1 combines AK12 logically with the drive signal TAS2 of the drive unit ST, and is connected on the output side to the diode TAS2 of the optocoupler OK2. Since, as described, the signal AK12 has a high level, the output of the AND gate L1 therefore respectively assumes the value of TAS2. An entirely normal operation of the transistor T2 via TAS2 with negative logic is thereby possible. The two further AND gates L2 and L3 combine the signal AK12 with the drive signals TAS4 and TAS6 in the same way for the purpose of driving the two remaining transistors T4 and T6 of the lower bridge arm via the optocouplers OK4 and OK6.

It is thereby possible in normal operation for the power transistors to be switched in an orderly way via the drive unit ST or the transistor drive signals TAS2, TAS4, TAS6 (a low level of TAS signifies transistor on).

As described in connection with FIG. 1, the switches S1 and S2 are opened for the function of "safe stopping". The switches S1 and S2 are likewise opened for the function of "safe braking by armature short-circuiting". The signal levels of AK1 and AK2 are then set to a logic low level, for example by coupling AK1 to SV1, and AK2 to SV2. Inverting drivers N1 and N2 then provide a HIGH level thereupon. On the output side, N1 and N2 are connected via downstream diodes V1 and V2 respectively polarized in the forward direction. This combining point is connected, firstly, to the respective anode-side terminals of the photodiodes of the optocouplers OK2, OK4 and OK6 and, secondly, to the output of the switch S2 via a further diode V3 polarized in the reverse direction, and thus to the actual supply voltage SV2. However, the actual supply voltage for driving the lower bridge arm is now not available, because switch S2 is open.

The supply voltage SV2' for the lower optocouplers OK2, OK4, OK6 is generated via N1 and V1 and/or via N2 and V2. The diode V3 blocks SV2' with respect to the switch S2. Independently of the levels of the drive unit signals TAS2, TAS4 and TAS6, the power transistors T2, T4, T6 of the lower bridge arm are turned on via the AND gates L1, L2 and L3 with the aid of signal AK12. Since the signal AK12 from AND gate L4 now outputs a low potential, each output of the AND gates L1 to L3 always conducts a low potential. Because of the negative logic, this signifies switching through of the optocouplers OK2, OK4 and OK6, and thus of the assigned transistors T2, T4 and T6. In this way, the two competing functions are implemented successively in common with one drive control A. As a result, it is possible to further reduce a residual risk with reference to dangerous movements.

The functioning of both armature short-circuiting drive paths can be tested via the read back signal SV2_Diag, which passes from the combining point SV2' to the system I1. The same holds for the functioning of switch S1 for the functioning of the tripping signal SH.

The motor M still executes an one-off rotor movement in the case of the breakdown of two power transistors situated opposite one another in the bridge arrangement, for example, T3 and T6, or of incorrect driving of two transistors situated opposite one another. In this case, the level of the rotor position movement (angular movement) is a function of a number of drive parameters, but is classed as relatively without danger for the worst imaginable case. If the lower transistors T2, T4 and T6 have already been turned on via the function of "braking by armature short-circuiting", additionally turning on an upper transistor or a number of the upper transistors T1, T3, T5 leads only to a bridge short circuit, with no current flowing through the motor M.

In addition to the implementation of the logic unit described above with the elements N1, N2, V1 to V3 and L1 to L4, it is also possible to find alternative embodiments of the invention by retaining the described functionality. This holds, in particular, for driving by way of the drive unit ST with positive logic.

While there have been described what are believed to be the preferred embodiments of the present invention, those skilled in the art will recognize that other and further changes may be made thereto without departing from the spirit of the invention and it is intended to claim all such changes and modifications as fall within the scope of the invention.

I claim:

1. A drive control for a three-phase AC motor via an inverter, the inverter having current valves in a bridge circuit, comprising:
    a first means for pulse inhibition of an upper bridge arm having a first set of current valves, and a second means for pulse inhibition of a lower bridge arm having a second set of current valves, wherein the first and second sets of current valves may be blocked upon selection or in the event of a fault by the first means for pulse inhibition and the second means for pulse inhibition;
    a means for braking by armature short-circuiting, with the aid of which upon selection or in the event of a fault a stator winding of a three-phase AC motor is short-circuited by switching the second set of current valves of the lower bridge arm; and
    means for switching the second set of current valves as the respective supply voltage for driving the current valves of lower bridge arm and/or those of the upper bridge arm are interrupted by a means for pulse inhibition.

2. The drive control of claim 1, wherein in the event of a fault at least one means for pulse inhibition is used to block all drive signals for a drive unit of the drive control for the first and second sets of current valves.

3. The drive control of claim 1, wherein the upper and the lower bridge arms are blocked separately.

4. The drive control of claim 1, wherein each means for pulse inhibition supplies a respective signal for driving a logic unit which is configured in such a way that in the event of a fault the voltage for switching off all current valves of a bridge arm can be generated from these signals in which case in the event of a fault the logic unit can provide independently of the signals of the drive unit of the drive control a respective drive signal for the current valves of a bridge arm used for armature short-circuiting.

5. The drive control of claim 1, wherein:
a positive dynamic activation of two pulse inhibition paths is performed by reading back supply voltages for driving the first set of current valves of the upper bridge arm and the second set of current valves of the lower bridge arm, respectively, for pulse inhibition; and activating the means for pulse inhibition and the means for braking by armature short-circuiting for the case in which at least one of these read back supply voltages is lacking.

6. The drive control of claim 1, wherein
a set of respective optocouplers serve to transmit drive signals to the first and second sets of current valves; and
in the event of a fault supply voltage of the set of optocouplers associated with the respectively assigned bridge arm is interrupted by each means for pulse inhibition.

7. The drive control of claim 1, wherein a crosswise comparison of external tripping signals assigned to the respective means for pulse inhibition is performed by virtue of the fact that the two means for pulse inhibition are interconnected via a bi-directional communications interface, it being possible for both means for pulse inhibition to be tripped in event of deviating tripping signals.

8. The drive control of claim 7, wherein two signals for driving the logic unit are combined logically with the drive signals for the second set of current valves of the bridge arm serving the purpose of armature short-circuiting in such a way that with activation of the voltage for switching on all current valves of a bridge arm there is also activation of the drive signals for the current valves of the bridge arm serving the purpose of armature short-circuiting.

9. The drive control of claim 8, wherein the two signals for driving the logic unit normally conduct high level and a voltage for switching on all current valves of a bridge arm is suppressed by appropriate inverting driver stages of the logic unit, both signals changing to low level in the event of a fault such that inverting driver stages of the logic unit provide on output side a voltage for switching on all current valves of the bridge arm.

10. The drive control of claim 9, wherein:
each current valve is switched by an associated drive signal of the drive unit of the drive control with low level; and
the logic unit combines the two signals to drive them via a logic AND gate, this logic signal respectively serving the purpose of further combination via respective further AND gates with the respective drive signals for the current valves of the bridge arm serving the purpose of armature short-circuiting.

\* \* \* \* \*